Patented Sept. 30, 1941

2,257,701

UNITED STATES PATENT OFFICE 2,257,701

DERIVATIVES OF CYCLOPENTANO-PHENANTHRENE AND PROCESS FOR THE MANUFACTURE OF SAME

Robert Ernest Meyer, Basel, Switzerland, assignor to Hoffmann-La Roche Inc., Nutley, N. J., a corporation of New Jersey No Drawing. Application February 3, 1940, Serial No. 317,213. In Switzerland February 9, 1939

5 Claims. (Cl. 260—397.4)

A number of physiologically active materials is based on the ring system of cyclopentano-phenanthrene having the formula:

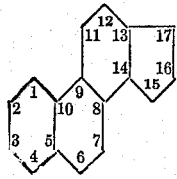

A carbon atom of various of these compounds carries two hydrogen atoms, and a neighbouring carbon atom an oxygen atom. This, for instance, applies to androsterone, androstandione, testosterone, progesterone, oestrone, equiline, equilenine, corticosterone, and cholestenone. Several of these compounds have been prepared by partial synthesis.

Amongst the substances having an oestrogenic action 6,7,8,9,11,12,13,14-octahydro-3, 16,17-trihydroxy-13-methyl-cyclopentano-phenanthrene is particularly valuable. It has hitherto been extremely difficult to obtain derivatives of cyclopentano-phenanthrene having a hydroxyl group on each of two adjacent carbon atoms of the pentane ring. One method obtaining such compounds employs the hydroxymethylene-ketones of the cyclopentano-phenanthrene series as intermediate products. It has now been found that hydroxymethylene-ketones of the cyclopentano-phenanthrene series can be prepared by condensing derivatives of cyclopentano-phenanthrene, having a methylene-group adjacent to a keto group, with an ester of formic acid. Thus, hydroxymethylene-oestrone of the formula:

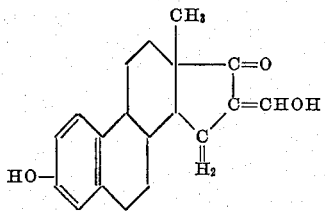

can, for instance, be obtained from oestrone. Any ester of formic acid may be employed for the condensation, for instance, the methyl-, ethyl-, or amyl ester of formic acid. Alkali-alcoholates, metallic sodium or sodium-amide, are, for instance, suitable condensing agents.

The new compounds are acid and show characteristic reactions with heavy metal salts. Their sodium salts are soluble in water. They can be used as intermediates in the manufacture of pharmaceutically important compounds.

*Example*

0.53 part by weight of sodium powder is prepared under toluene and after cooling covered with a little absolute ether. While cooling with ice, a suspension of 2.7 parts by weight of oestrone in 30 parts by weight of absolute ether and 10 parts by weight of amyl-formate is added and the mixture then shaken for several hours. After treatment with ice and a quantity of water sufficient to dissolve the resulting sodium salt, the mixture is thoroughly extracted with ether for the purpose of removing oestrone. The aqueous solution is filtered and the 16-hydroxymethylene-oestrone precipitated with acid after efficient cooling. The melting point of the newly precipitated unpurified compound lies at about 225° C.

The purity of the compound can be calculated by titration with alkali. The following result was obtained: 0.0211 g. of substance were dissolved in 1 cc. of alcohol and 0.5 cc. of n/2 alcoholic caustic potash solution and back titrated with n/2 HCl. Consumption of alkali:

Calculated for $C_{19}H_{22}O_3$   0.141 cc. of n/2 KOH
Found                              0.139 cc. of n/2 KOH

I claim:

1. A derivative of cyclopentanophenanthrene selected from the group consisting of hydroxymethylene derivatives of 3-oxo-and 17-oxo-cyclopentanophenanthrenes wherein the hydroxymethylene group is on a carbon atom adjacent to the keto group.

2. 6,7,8,9,11,12,13,14-octahydro-3-hydroxy-13-methyl-17-oxo-16-hydroxymethylene-cyclopentano-phenanthrene.

3. Process for the manufacture of derivatives of cyclopentano-phenanthrene, comprising condensing derivatives of cyclopentano-phenanthrene, containing a keto-group adjacent to a methylene-group, with an ester of formic acid.

4. Process for the manufacture of 6,7,8,9,11,-12,13,14-octahydro-3-hydroxy-13-methyl-17-oxo-16-hydroxymethylene-cyclopentano-phenanthrene, comprising reacting 6,7,8,9,11,12,13,14,-octahydro-3-hydroxy-13-methyl-17-oxo-cyclopentano-phenanthrene (oestrone) with a lower aliphatic ester of formic acid in presence of an alkaline condensing agent.

5. Process for the manufacture of 6,7,8,9,11,12,-13,14-octahydro-3-hydroxy-13-methyl-17-oxo-16-hydroxymethylene-cyclopentano-phenanthrene, comprising reacting 6,7,8,9,11,12,13,14-octahydro-3-hydroxy-13-methyl-17-oxo-cyclopentano-phenanthrene (oestrone) with a lower aliphatic ester of formic acid in presence of metallic sodium.

ROBERT ERNEST MEYER.